US011288622B2

(12) United States Patent
Banvait et al.

(10) Patent No.: US 11,288,622 B2
(45) Date of Patent: Mar. 29, 2022

(54) SYSTEMS, METHODS, AND DEVICES FOR AUTOMATED VEHICLE AND DRONE DELIVERY

(71) Applicant: Ford Global Technologies, LLC, Dearborn, MI (US)

(72) Inventors: Harpreetsingh Banvait, Dearborn, MI (US); Scott Vincent Myers, Dearborn, MI (US); Alexandru Mihai Gurghian, Dearborn, MI (US); Mohamed Ahmad, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 16/307,031

(22) PCT Filed: Jun. 6, 2016

(86) PCT No.: PCT/US2016/036047
§ 371 (c)(1),
(2) Date: Dec. 4, 2018

(87) PCT Pub. No.: WO2017/213621
PCT Pub. Date: Dec. 14, 2017

(65) Prior Publication Data
US 2019/0220819 A1 Jul. 18, 2019

(51) Int. Cl.
G06Q 10/08 (2012.01)
B64C 39/02 (2006.01)
G01C 21/34 (2006.01)
G05D 1/00 (2006.01)
G05D 1/02 (2020.01)
B64F 1/36 (2017.01)

(52) U.S. Cl.
CPC ..... *G06Q 10/08355* (2013.01); *B64C 39/024* (2013.01); *G01C 21/3453* (2013.01); *G05D 1/0088* (2013.01); *G05D 1/0212* (2013.01); *G06Q 10/083* (2013.01); *G06Q 10/0832* (2013.01); *B64C 2201/128* (2013.01); *B64C 2201/208* (2013.01); *B64F 1/364* (2013.01)

(58) Field of Classification Search
CPC .......... G06Q 10/08355; G06Q 10/083; G06Q 10/0832; B64C 39/024; G01C 21/3453; G05D 1/0088; G05D 1/0212
USPC .......................................................... 701/16
See application file for complete search history.

(56) References Cited

U.S. PATENT DOCUMENTS

| 9,536,216 | B1 * | 1/2017 | Lisso | G01S 19/13 |
| 9,573,684 | B2 * | 2/2017 | Kimchi | B64C 39/024 |
| 9,928,474 | B1 * | 3/2018 | Evans | G06Q 10/083 |

(Continued)

*Primary Examiner* — Peter D Nolan
*Assistant Examiner* — Luke Huynh
(74) *Attorney, Agent, or Firm* — Brandon Hicks; Eversheds Sutherland (US) LLP

(57) ABSTRACT

A method for package delivery includes identifying a plurality of delivery locations for package delivery. The method includes determining a driving route for an automated ground vehicle to optimize delivery to the delivery locations using one or more automated aerial vehicles. The method includes controlling the automated ground vehicle to navigate the delivery route. The method further includes determining timing for release of the one or more automated aerial vehicles during navigation of the delivery route to deliver packages to the plurality of delivery locations.

17 Claims, 6 Drawing Sheets

(56) References Cited

U.S. PATENT DOCUMENTS

| | | | | |
|---|---|---|---|---|
| 2015/0102154 A1* | 4/2015 | Duncan | ............... | G05D 1/0094 244/2 |
| 2015/0370251 A1* | 12/2015 | Siegel | ..................... | G05D 1/00 701/2 |
| 2016/0200438 A1* | 7/2016 | Bokeno | .................. | B60L 53/53 244/2 |

* cited by examiner

SYSTEMS, METHODS, AND DEVICES FOR AUTOMATED VEHICLE AND DRONE DELIVERY

TECHNICAL FIELD

The disclosure relates generally to methods, systems, and devices for delivery of packages or other physical objects and more particularly relates to delivery using a ground vehicle and one or more aerial vehicles.

BACKGROUND

Very large numbers of packages are delivered to business, residential, and other locations on a daily basis. Package delivery of small quantities of items is often completed using a delivery truck, van, or other vehicle that is driven by a human driver. The human may drive the vehicle between delivery locations and walk with a package up to or into a building, mailbox, or other location in order to deliver the package. Recently, discussion of delivery using aerial vehicles or drones has been discussed. For example, systems such as Amazon Prime Air® propose the use of a drone to deliver a single package from a warehouse to a destination.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
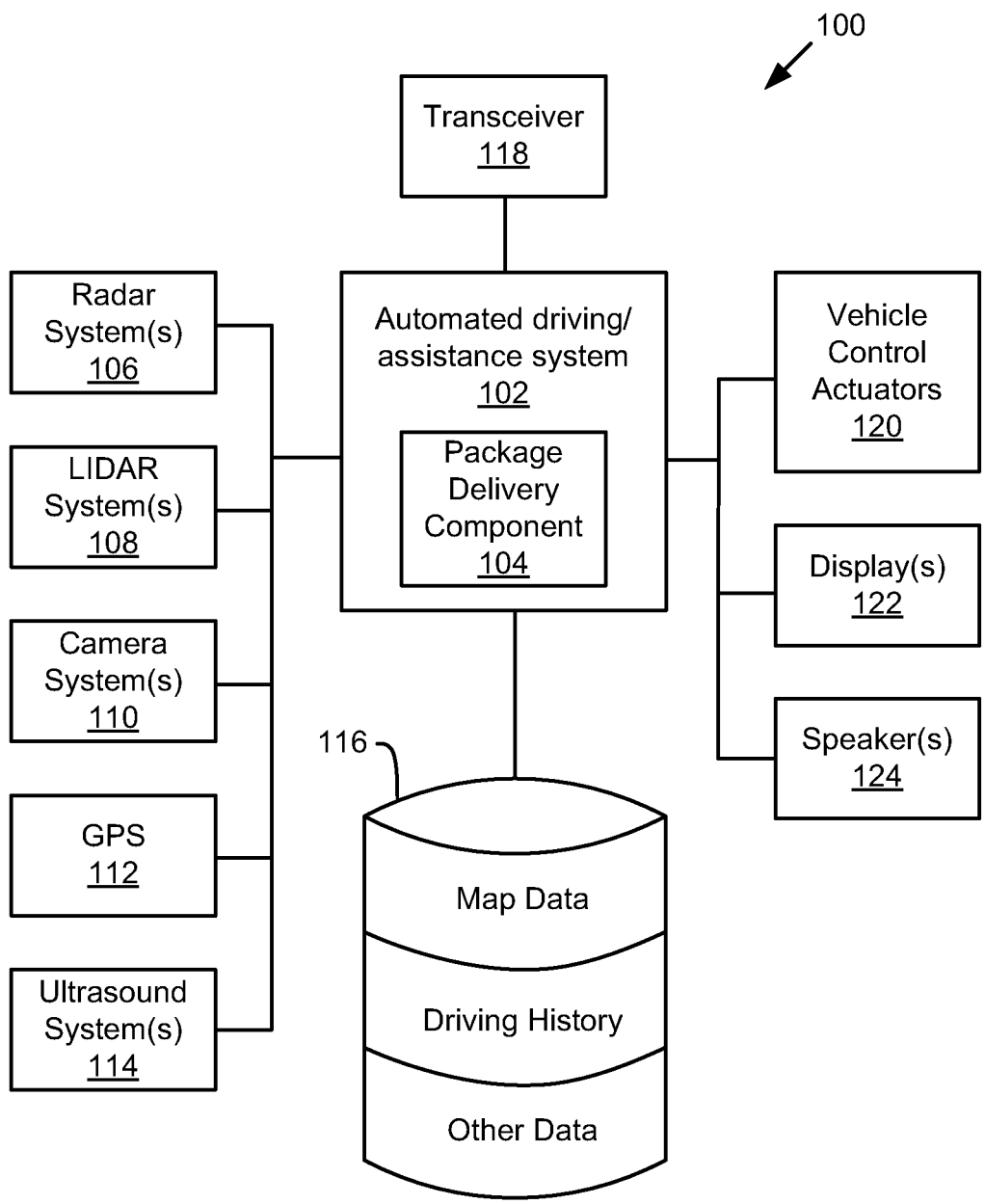
FIG. 1 is a schematic block diagram illustrating an implementation of a vehicle control system that includes an automated driving/assistance system.

Applicants have recognized and developed significant improvements to systems, methods, and devices for package delivery. Applicants have recognized that significant benefits may be achieved by delivering packages or items using both an automated vehicle and one or more automated drones that periodically ride with the automated vehicle. In some cases, this can greatly increase efficiency and delivery speed as a drone is not required to repeatedly carry small packages directly from a warehouse to multiple destinations within the same neighborhood. Rather, an autonomous vehicle can carry numerous packages to a neighborhood and one or more drones can be dispatched from the vehicle to deliver packages at the same time. For example, the autonomous vehicle may carry a plurality of packages for a specific neighborhood and remain in or near the specific neighborhood until all packages have been delivered by the one or more drones.

According to one embodiment, a control system for an automated vehicle may include an identification component, a delivery route component, a control component, and a release component. The identification component is configured to identify a plurality of delivery locations for package delivery. The delivery route component is configured to determine a driving route for an automated ground vehicle to optimize delivery to the delivery locations using one or more automated aerial vehicles. The control component is configured to control the automated ground vehicle to navigate the delivery route. The release component is configured to determine timing for release of the one or more automated aerial vehicles during navigation of the delivery route to deliver packages to the plurality of delivery locations.

Embodiments disclosed herein may utilize an autonomous delivery vehicle and multiple drones that ride, at times, with the vehicle. The drones may dock, attach, or rest inside the vehicle, such as within a cargo area or other compartment. In one embodiment, the drones may selectively dock, attach, rest on the outside of the vehicle. The drones may charge using a wired or wireless connection to the autonomous deliver vehicle. When human delivery is used, packages may be loaded into the autonomous delivery vehicle an order such that the human can manually access the packages to be delivered from first to last according to the route. In a similar manner, the vehicle may be loaded in a manner or order that allows packages earlier in the route to be accessed before packages later in the route.

In one embodiment, the autonomous vehicle will follow a path that maximizes the number of packages that can be delivered in one trip. This is a difficult problem but may be similar to methods used by any successful package delivery business. However, the vehicle is autonomous and multiple drones can replace the single human who both operates the vehicle and delivers the packages. Additionally, the route planning for the use of drones (one or more) is also different because the ground vehicle need not travel along the exact some roadway where the delivery is to be made. For example, a drone may fly from a current location of a ground vehicle a couple of streets over to a delivery location for a specific package. In this way significant time and energy savings can be achieved. In one embodiment, multiple drones are used to deliver packages at the same time. In one embodiment, the ground vehicle may not even need to stop and park. For example, the drones may be deployed if there is a traffic jam and start delivering packages while the ground vehicle is on a road of the delivery route.

The type of ground vehicle use may vary greatly depending on industry or environment. For example, the vehicle's size and power depends on the payload. Trucks and vans may be used for bigger and longer lasting payloads. In the case of food, such as pizza or baked goods, a smaller sized vehicle may be desirable so that the last product delivered in the route can still be fresh or hot. In one embodiment, the ground vehicle will have a large electrically powered sliding window, such as on a back door or in a roof. When a drone needs to access or leave a cargo area, the window may be opened. For example, when it's time for a drone to obtain a package from inside the truck, the sliding windows may open to allow a drone to fly into the vehicle to grab a package and fly out to deliver it. The window may remain closed otherwise to protect the packages.

In one embodiment, the drones may dock or "rest" inside the back of the vehicle's cargo area. The drones may charge using either a wired or wireless inductive charging system from the vehicle's alternator or battery, or other power source. To deliver a package, the drone may leave or detach from the charging system and fly toward the packages in cargo area, unloading packages from the rear of the cargo area toward the front and/or from the top down. The drone may scan markers on a package, such as quick response (QR) code, to choose a package. When the correct package is detected, the drone may pick up or attach to the package and carry it out of the ground vehicle and toward a delivery location. In one embodiment, the drone will use computer vision, machine learning, and maps to navigate to the destination. The destination may have some marker, such as a large QR code, to identify the address or delivery location.

As used herein the terms "drone" or "automated aerial vehicles" are given to mean vehicles that are capable of flight and/or navigation with little or no real-time human input. For example, embodiments of drones or aerial vehicles disclosed herein may deliver packages from a ground vehicle to a delivery location with no input from a local or remote human operator.

Further embodiments and examples will be discussed in relation to the figures below.

FIG. 1 illustrates an example vehicle control system 100 that may be used for assisting a human driver or performing automated driving to deliver packages. The vehicle control system 100 may include an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include a package delivery component 104 for determining routes, drone release times, or the like to deliver packages using one or more drones.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, a delivery drone, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 is configured to control driving or navigation of a parent vehicle. For example, the automated driving/assistance system 102 may control the vehicle control actuators 120 to drive a delivery route to deliver one or more packages, items, or other physical objects. In one embodiment, the automated driving/assistance system 102 may determine or select a delivery route based on delivery locations for one or more packages to be carried along the delivery route. In one embodiment, while driving or navigating a driving route, the automated driving/assistance system 102 may select a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement one or more algorithms, applications, programs, or functionality that drive or assist in driving of the vehicle. In one embodiment, the package delivery component 102 may be used to select a driving route, control release or retrieval of delivery drones, or perform other delivery control functions for the automated driving/assistance system 102.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
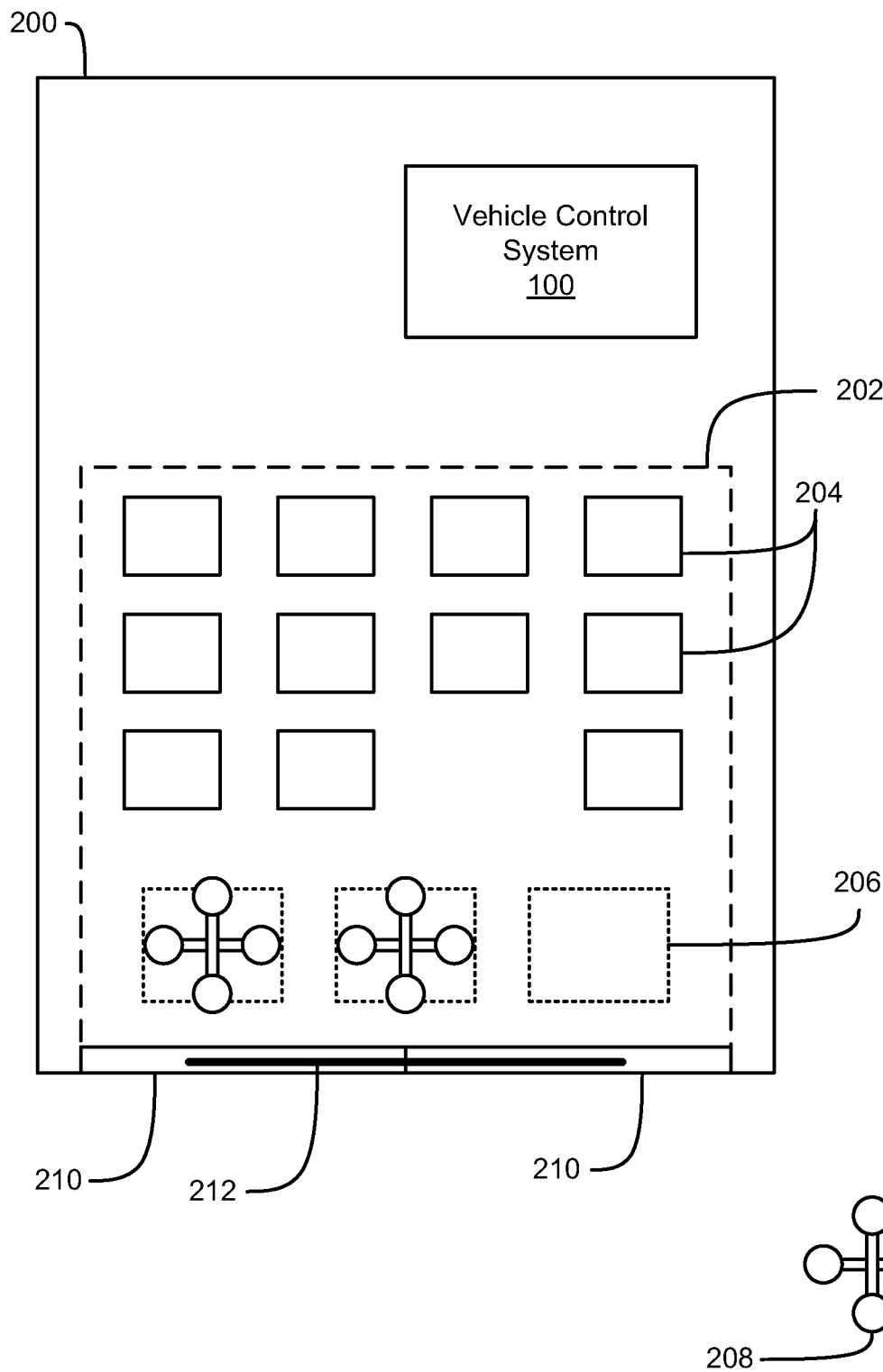
FIG. 2 is a schematic block diagram illustrating components of an automated delivery vehicle, according to one implementation.

FIG. 2 is a schematic diagram illustrating one embodiment of an automated vehicle 200. The automated vehicle 200 may be partially or fully automated to drive a delivery route. The automated vehicle 200 includes a vehicle control system, such as the vehicle control system 100 of FIG. 1. In one embodiment, the vehicle control system 100 may select a driving route, control the vehicle 200 to navigate the selected driving route, and determine timing for release of a drone or aerial vehicle to deliver a package. The vehicle control system 100 may control the automated vehicle 200 so that little or no human input is required during driving or navigation of a delivery route. The automated vehicle 200 also includes a cargo area 202. The cargo area may receive and/or store a plurality of packages 204 containing items to be delivered. The cargo area 202 may include one or more docking locations 206 for one or more automated aerial vehicles 208, or drones, to land and ride with the automated vehicle 200. For example, the docking locations 206 may include a mat and/or a connector for the automated aerial vehicles 208 to anchor, power down, and/or recharge. The docking locations 206 may include wired charging connectors or wireless charging coils to charge the automated aerial vehicles 208.

The automated vehicle 200 also includes doors 210 which may be opened for loading/or unloading the packages 204. In one embodiment, the doors may be opened to allow a human, robot, or other entity to enter or exit the cargo area 202. The automated vehicle 202 also includes one or more windows 212. The windows 212 may be sized to allow an automated aerial vehicle 208, with or without a package, to fly through. For example, one or more windows 212 (such as a window on each door that can be opened to form a single opening) may be opened to allow an automated aerial vehicle 208 to exit or enter the cargo area 202. When it is time to deliver a package, an automated aerial vehicle 208 may power on, begin flight and retrieve and/or attach to one of the packages 204. The automated aerial vehicles 208 may then fly out the windows 212 with the package and then proceed to a delivery location for placement/delivery of the package. After the package is delivered, the automated aerial vehicles 208 may return to the automated vehicle 200, fly through the windows 212 and either land on a docking location 206 or retrieve yet another package for delivery. The windows 212 may remain closed unless an automated aerial vehicles 208 needs to exit or enter the cargo area 202. Keeping the windows 212 closed may help protect the packages 204 and/or the automated aerial vehicles 208 from rain, snow, wind, wind driven particles, humidity, heat or cold, or other weather elements.

As will be understood in light of this disclosure, the size of the cargo area 202 may vary significantly. For example, the cargo area 202 may be a cargo area within a large delivery truck, van, or other vehicle. The cargo area 202 may also be smaller in situations where a smaller number of packages are delivered within a single delivery route.

Figure 3:
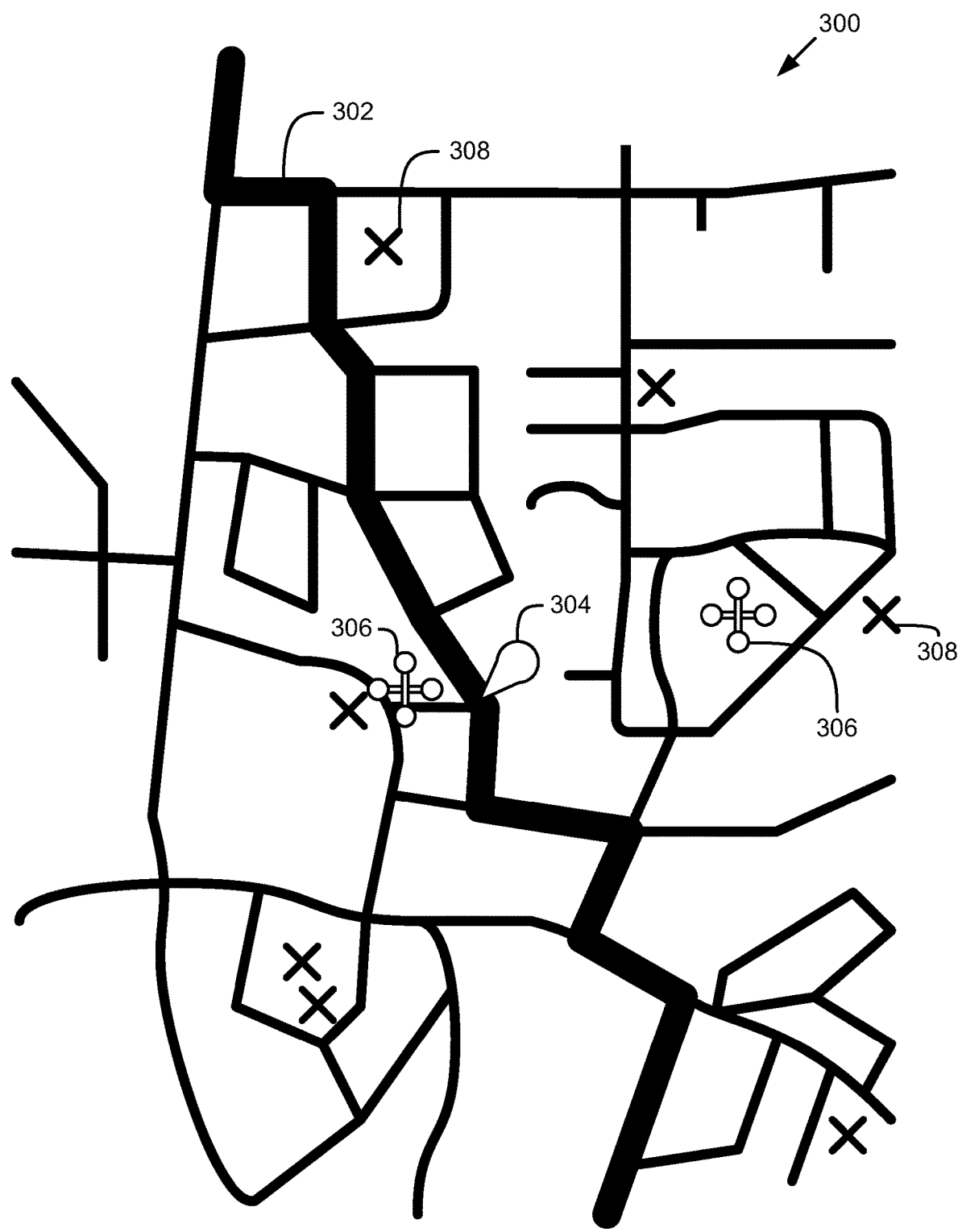
FIG. 3 illustrates a map of a delivery route and a plurality of delivery locations, according to one implementation.

FIG. 3 illustrates a map 300 of a neighborhood along a driving route 302. A current location 304 of an autonomous ground vehicle and a plurality of autonomous aerial vehicles 306 are illustrated. A plurality of delivery locations 308 (each marked with an X in the figure) is also shown. According to one embodiment, before or during navigation of a delivery route, the autonomous ground vehicle may determine an optimal delivery route based on the delivery locations 308. For example, the a plurality of delivery locations 308 may be selected and a package delivery component 104 may determine a route having a shortest distance or travel time but still passes within at least a drone flight range of all delivery locations. In one embodiment, the package delivery component 104 determines a route that passes through the middle of the plurality of delivery locations even though the route does not pass down the same street as one or more of the delivery locations.

In one embodiment, the package delivery component 104 also determines timing or time windows for releasing an aerial vehicle 306 for releasing packages for each delivery location. For example, the package delivery component 104 may determine timing where the distance between where an aerial vehicle 306 is released and a delivery location plus a distance between the delivery location and where the aerial vehicle 306 will be retrieved again is within a flight distance for the drone. For example, the autonomous ground vehicle may travel between release and retrieval of an automated aerial vehicle 306. During travel of the delivery route 302, the autonomous vehicle may determine a current location, such as by using a positioning system. For example, the autonomous vehicle may include a global navigation satellite system (GNSS) receiver, such as a Global Positioning System (GPS) receiver, Global Navigation Satellite System (GLONASS) receiver, Galilleo, or Beidou system mounted in the vehicle.

Using the current location 304 and/or any other available data, the package delivery component 104 may determine when to release one or more aerial vehicles 306, when to wait to allow an aerial vehicle 306 to be retrieved, or the like. In one embodiment, the autonomous vehicle may stop to allow an aerial vehicle 306 to be dispatched or received. For example, the autonomous vehicle may release an aerial vehicle 306, travel some distance, release another aerial vehicle 306, travel some additional distance, and then wait to receive the previously dispatched aerial vehicles 306. In one embodiment, the autonomous vehicle may be configured to release and/or retrieve the aerial vehicles 306 while the autonomous vehicle is driving. For example, the autonomous vehicle may not need to stop or only stop infrequently, thus maintain progress along the route while aerial vehicles 306 perform deliveries. Additionally, when an aerial vehicle 306 is out for delivery, the autonomous vehicle may periodically update the aerial vehicle 306 of the current location 304 so that the aerial vehicles 306 may know how to return to the autonomous vehicle.

Figure 4:
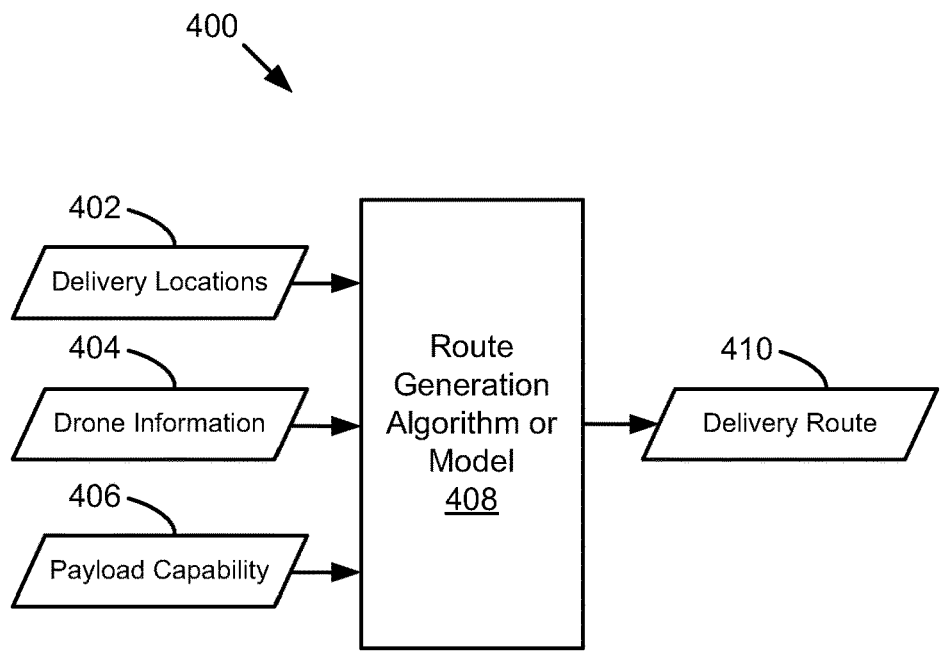
FIG. 4 is a schematic diagram illustrating a method for generating or selecting a delivery route, according to one implementation.

FIG. 4 is a schematic diagram illustrating a method 400 for generating a delivery route, according to one embodiment. The method 400 may be performed by a package delivery component 104 and/or an automated driving/assistance system 102.

The method 400 begins and delivery locations 402, drone information 404, payload capability 406, and/or other information may be provided to a route generation algorithm or model 408. Based on the provided information, the route generation algorithm or model 408 generates a delivery route 410. The generated delivery route 410 may include a route to be used by an automated vehicle to deliver packages using one or more drones. The delivery locations 402 may include addresses, GPS locations, or other location information indicating where one or more packages are to be delivered. The drone information 404 may include information about a number of drones to be used during delivery and/or information about the drones. For example, the drone information 404 may include flight limitations such as flight range for the drones to be used during a particular delivery. Generally, a greater number of drones and/or a greater flight range may result in a shorter or quicker completion of a package delivery route. The payload capability 406 may include information about how many packages an autonomous ground vehicle that will be following the delivery route 410 can carry. For example, the payload capability may indicate a volume, tonnage, or other information about the autonomous vehicle.

Using the provided information, the route generation algorithm or model 408 may generate and/or select a delivery route 410. The route generation algorithm or model 408 may include a model or a neural network that receives the input data and computes or otherwise generates a delivery route 410. In one embodiment, the route generation algorithm or model 408 generates a route that passes through a middle of one or more delivery locations to reduce distances that drones must fly to perform deliveries. In one embodiment, the route generation algorithm or model 408 may minimize a travel distance or travel time for an autonomous ground vehicle while having the distance between a delivery location and the closest point on the delivery route 410 be no greater than a flight range of one or more drones. In one embodiment, route generation algorithm or model 408 may use a least squared error or at least distance computation to produce a route that balances minimization of a total delivery route length and the total flight distance that must be performed by any delivery drones. The delivery route 410 may include specific navigation information including street names, locations, or the like. The delivery route 410 information may include sufficient detail to enable a fully or partially autonomous vehicle to navigate the delivery route 410.

The route generation algorithm or model 408 may include any type of machine learning, deep learning, or other model or algorithm. For example, the route generation algorithm or model 408 may include a neural network with parameters trained on a training set including different routes, delivery locations, and/or drone configurations. In one embodiment, the route generation algorithm or model 408 may use an algorithm to compute a plurality of different routes and then select one that optimizes a combination of autonomous vehicle driving distance and/or aerial vehicle flight distance. For example, different routes may be evaluated based on weighted sums of various aspects that include flight times, driving times, driving distance, flight distance, overall delivery time, or the like.

Figure 5:
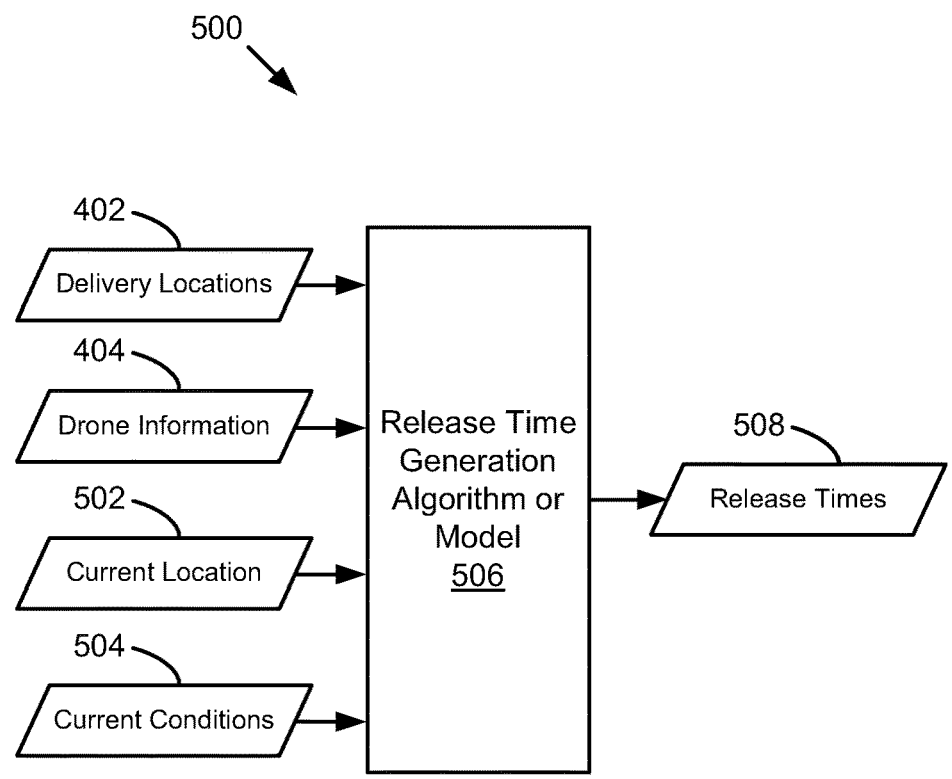
FIG. 5 is a schematic diagram illustrating a method for determining release times for one or more aerial vehicles to perform package delivery, according to one implementation.

FIG. 5 is a schematic diagram illustrating a method 500 for generating a delivery route, according to one embodiment. The method 500 may be performed by a package delivery component 104 and/or an automated driving/assistance system 102. The method 500 begins and delivery locations 402, drone information 404, a current location 502 of an autonomous ground vehicle, and/or current conditions 504 are provided to a release time generation algorithm or model 506. The current location 502 may include a current location as determined by a positioning system of an autonomous ground vehicle that will carry packages and one or more aerial delivery drones. The current location 502 may be updated in real-time or on a frequent periodic basis, such as every few seconds or minutes. The current conditions 504 may include information about current traffic conditions, current weather conditions, or the like. For example, with poor traffic conditions, the release times for aerial vehicles, or even a delivery route itself, may be modified. As another example, current weather conditions may dictate that aerial vehicles need to be released closer to a delivery destination in order to deal with wind or adverse weather.

Using the provided information, the release time generation algorithm or model 506 may generate and/or select one or more release times 508 for aerial vehicles to depart from an autonomous ground vehicle for delivery to delivery locations. The release time generation algorithm or model 506 may include a model or a neural network that receives the input data and computes or otherwise generates the release times 508. In one embodiment, the release time generation algorithm or model 506 generates release times that optimize travel time of the ground vehicle. For example, the release times may be optimized to reduce the number of stops, if any, to be performed by the ground vehicle. Additionally, the release times may be selected so that aerial vehicles have sufficient flight range to perform the delivery and return trip to the ground vehicle, based on remaining battery power, or other flight range information.

The release time generation algorithm or model 506 may include any type of machine learning, deep learning, or other model or algorithm. For example, the release time generation algorithm or model 506 may include a neural network with parameters trained on a training set including different routes, delivery locations, and/or drone configurations. In one embodiment, the release time generation algorithm or model 506 may use an algorithm to compute a plurality of different release times for a specific deliver location and then select one that optimizes a combination of autonomous vehicle driving distance and/or aerial vehicle flight distance. For example, different release times may be evaluated based on weighted sums of various aspects that include flight times, driving times, driving distance, flight distance, overall delivery time, or the like.

Figure 6:
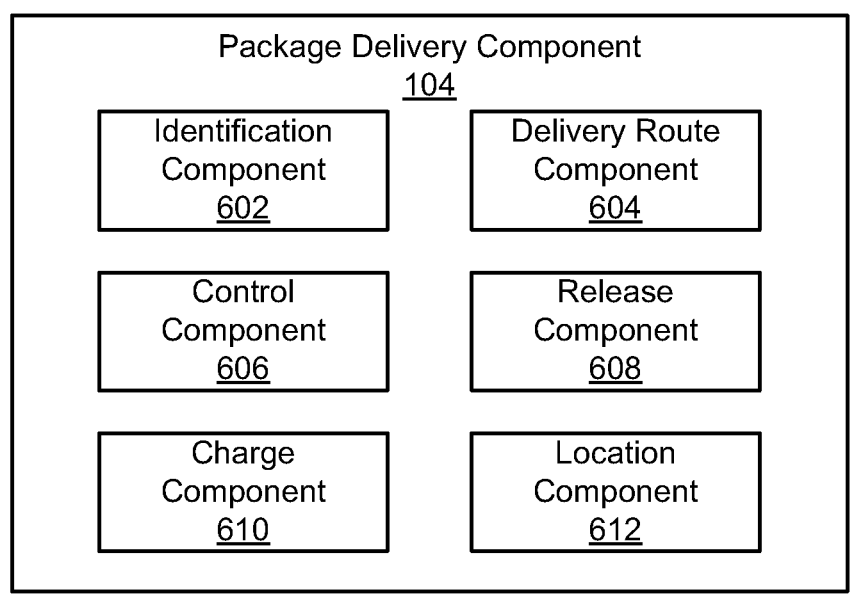
FIG. 6 is a schematic block diagram illustrating example components of a package delivery component, according to one implementation.

FIG. 6 is a block diagram illustrating example components of a package delivery component 104, according to one implementation. In the depicted embodiment, the package delivery component 104 includes an identification component 602, a delivery route component 604, a control component 606, a release component 608, a charge component 610, and a location component 612. The components 602-612 are given by way of illustration only and may not all be included in all embodiments. In fact, some embodiments may include only one or any combination of two or more of the components 602-612. Furthermore, some of the components 602-612 may be located outside the package delivery component 104, such as within an automated driving/assistance system 102 of a vehicle, or a server remote from an automated vehicle.

The identification component 602 is configured to identify a plurality of delivery locations for package delivery. For example, the identification component 602 may identify a set of packages that need to be delivered and delivery locations corresponding to those packages. The set of packages may include packages that are to be delivered to a neighborhood, geographic region, or area where a vehicle will be performing package deliveries. For example, an autonomous vehicle may be scheduled to perform deliveries in a specific geographic region and the identification component 602 may identify packages to be delivered in that geographic area. The delivery locations may include addresses, global positioning coordinates (such as GPS coordinates), or the like to identify specifically where the packages are to be delivered.

The delivery route component 604 is configured to determine a route for a parent vehicle, such as an autonomous delivery vehicle, to follow to perform deliveries to (at least a subset of) the delivery locations identified by the identification component. The delivery route component 604 may determine a delivery route that optimizes delivery to the delivery locations using one or more automated aerial vehicles. For example, the delivery route component 604 may determine a delivery route that optimizes delivery based on the use of one or more aerial vehicles that can selectively depart from the autonomous delivery vehicle (which may be a ground vehicle) to carry packages to specific delivery locations.

The route traveled by an ground vehicle that acts as a carrier of aerial vehicles, or drones, that actually deliver the packages may vary significantly from routes traveled when a human driver both drives a vehicle and physically delivers the packages. For example, the delivery route determined by the delivery route component 604 may not actually pass on the street, or drive by the exact address, where a package is to be delivered. In one embodiment, the autonomous vehicle may pass, at closest, one or more streets or blocks away from a destination delivery location because an aerial vehicle can fly over houses, buildings, or locations where there are no roads or pathways to deliver to the destination.

In one embodiment, the delivery route may include a route through a middle of a plurality of delivery locations so that drones can fly in whatever direction necessary to accomplish delivery. In one embodiment, the delivery route component 604 may determine a delivery route that minimizes a distance or travel time for an autonomous ground vehicle, while still passing within at least a flight range of all delivery locations. For example, the delivery route component 604 may generate a route that, at least some point, passes within a flight range of at least one drone or aerial vehicle that will deliver packages from an autonomous ground vehicle. The flight range may include a maximum flight range of an aerial vehicle or may be an estimated or actual flight range that an aerial a vehicle will have at a specific point in the route. For example, aerial vehicles may not be able to completely recharge a battery or replenish fuel between each delivery and thus may have left than a maximum flight range. In one embodiment, the delivery route component 604 may compute a delivery route in advance of departure of an autonomous delivery vehicle or may periodically, or in real-time, compute or recomputed the delivery route to optimize delivery based on changing or unexpected conditions.

The delivery route component 604 may include or use a route generation algorithm or route generation model, such as the route generation algorithm or model 408 of FIG. 4. The delivery route component 604 may include one or more neural networks, deep neural networks, or other network that has been trained to generate at least a portion of a delivery route. The delivery route component 604 may use an algorithm or model with parameters that have been trained for route generation specific autonomous vehicles that will uses autonomous aerial vehicles to accomplish delivery.

The control component 606 is configured to control an automated ground vehicle to navigate a delivery route, such as the delivery route determined by the delivery route component 604. The control component 606 may provide navigation information or instructions to an automated driving/assistance system 102 or vehicle control system 100 of a vehicle. For example, the control component 606 may provide details of a delivery route to the automated driving/assistance system 102 or vehicle control system 100. As another example, the control component 606 may provide an instruction for a next turn, merge, stop, or the like to be performed by the vehicle. Thus, the control component 606 may provide instructions or information to control operation while allowing an automated driving/assistance system 102 or vehicle control system 100 to perform actual steering, braking, acceleration, or collision avoidance decisions and maneuvers. The control component 606 may provide navigation to ensure that an autonomous ground vehicle (and any associated aerial vehicles) is progressing during the process of package delivery.

The release component 608 is configured to determine timing for release of one or more automated aerial vehicles during navigation of the delivery route. For example, the release component 608 may generate a control signal to send a wired or wireless message to an aerial vehicle to depart from a cargo area with a package for delivery. The release component 608 may determine a timing for release such that the aerial vehicle will be within a flight range of a delivery location. The release component 608 may determine the release time based on a current or predicted charge or fuel level, package weight, wind resistance, or other aspect that may affect flight range. For example, heavier packages may take significantly more fuel or battery power to fly the same distance as a lighter package. The release component 608 may also determine timing for release based on one or more of current traffic conditions along the driving route, a speed of the automated ground vehicle (physical speed or progress rate of delivery), or one or more weather conditions.

In one embodiment, the release component 608 may provide a message to an aerial vehicle (e.g., using a wireless transceiver) indicating which package is to be delivered. For example, the message may include a serial number that matches a barcode on a package within a cargo area of the autonomous ground vehicle. Based on the message, the aerial vehicle may, in a resting or flying state, scan the packages to identify which package corresponds to the message. Messages may be provided via direct radio communication or via a network such as a local area network (LAN) for the autonomous vehicle or a wireless mobile network, such as those used by smartphones or other mobile communication devices. Based on the information in the message, the aerial vehicle may retrieve, attach to, or otherwise obtain the package and fly toward a delivery location. In one embodiment, the aerial vehicle and/or package may be within an enclosed cargo area and may need to exit the cargo area via a window. The release component 608 may generate a control signal to open or close a window of the automated vehicle to allow the one or more automated aerial vehicles to selectively enter or exit a cargo area of the automated ground vehicle. For example, at or about the same time the release component 608 sends a message with information to trigger departure of an aerial vehicle, the release component 608 may also trigger opening of a window to allow the aerial vehicle to exit. As another example, the release component 608 may receive a message from an aerial vehicle that it is ready to exit the cargo area and the release component 608 may open the window in response to the message.

Similar to the delivery route component 604, the release component 608 may include or use an algorithm or model to determine release timing. For example, the release component 608 may include a release time generation algorithm or release time generation model, such as the release time generation algorithm or model 506 of FIG. 5. The release component 608 may include one or more neural networks, deep neural networks, or other network that has been trained to generate release times. The release component 608 may use an algorithm or model with parameters that have been trained for generating release times to accomplish delivery.

The charge component 610 is configured to control charging or refueling of the one or more aerial vehicles used for delivery. For example, a cargo area, or other location on or in an autonomous vehicle, may include charging mats or charging connectors at a landing area or dock. The charge component 610 may provide electrical energy or fuel to replenish a battery or fuel tank when the drones are docked or resting, as needed, to maximize a total flight range that the drone can fly during a subsequent delivery.

The location component 612 is configured to provide location information for an autonomous ground vehicle to one or more corresponding aerial vehicles. Because the ground vehicle may travel or move while an aerial vehicle is away from the ground vehicle, it may be necessary to communicate the current location of the ground vehicle to the aerial vehicle. For example, the location component 612 may determine a current location of the ground vehicle using a positioning system, and then trigger transmission of that information, using a radio or wireless mobile network to aerial vehicles which are not currently riding with or docked with the ground vehicle. In one embodiment, this allows the ground vehicle to be continually moving during delivery of the packages.

Figure 7:
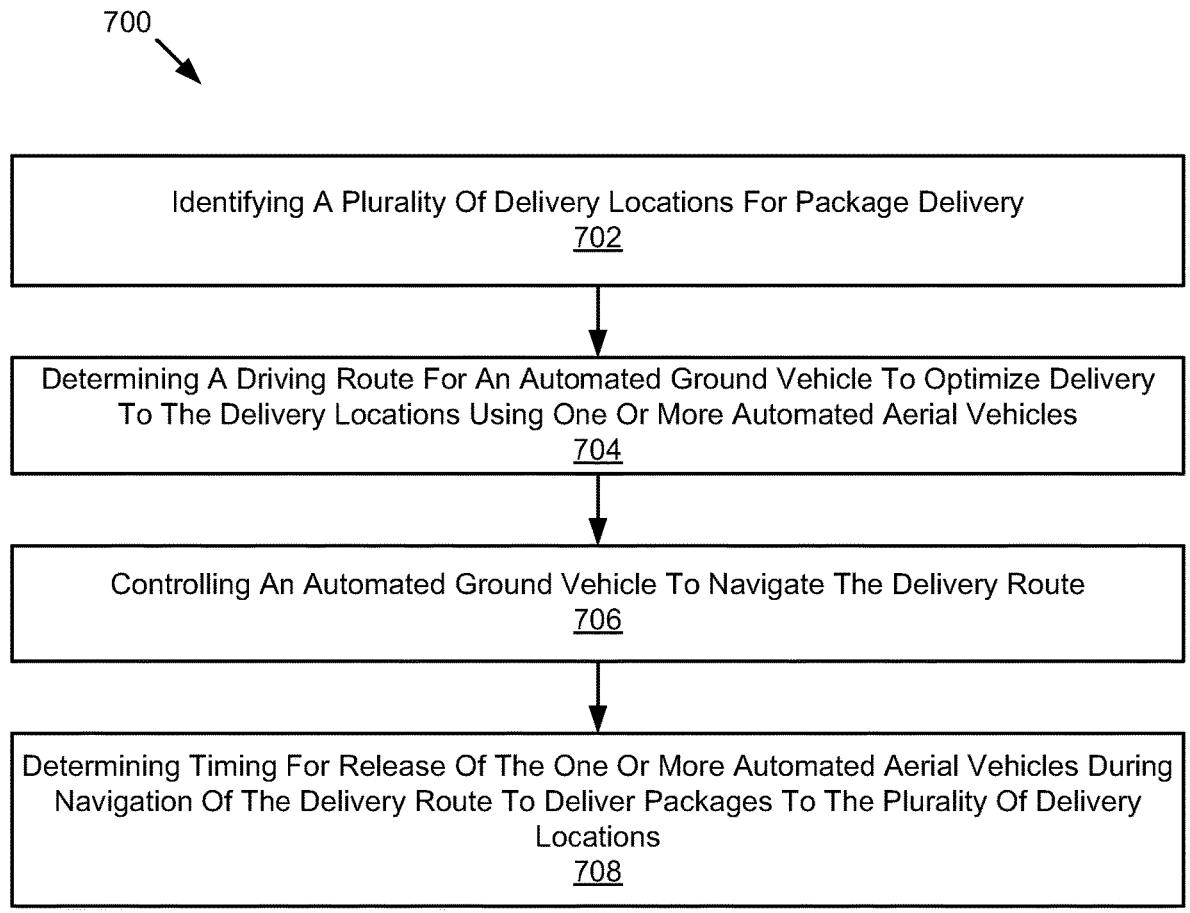
FIG. 7 is a schematic flow chart diagram illustrating a method for package delivery, according to one implementation.

Referring now to FIG. 7, a schematic flow chart diagram of a method 700 for package delivery is illustrated. The method 700 may be performed by a package delivery component 104 or an automated driving/assistance system, such as the package delivery component 104 of FIG. 1 or 5 or the automated driving/assistance system 102 of FIG. 1.

The method 700 begins and an identification component 602 identifies 702 a plurality of delivery locations for package delivery. A delivery route component 604 determines 704 a driving route for an automated ground vehicle to optimize delivery to the delivery locations using one or more automated aerial vehicles. A control component 606 controls 706 the automated ground vehicle to navigate the delivery route. A release component 608 determines 708 timing for release of the one or more automated aerial vehicles during navigation of the delivery route to deliver packages to the plurality of delivery locations.

EXAMPLES

The following examples pertain to further embodiments.

Example 1 is a method that includes identifying a plurality of delivery locations for package delivery. The method includes determining a driving route for an automated ground vehicle to optimize delivery to the delivery locations using one or more automated aerial vehicles. The method includes controlling the automated ground vehicle to navigate the delivery route. The method also includes determining timing for release of the one or more automated aerial vehicles during navigation of the delivery route to deliver packages to the plurality of delivery locations.

In Example 2, determining the driving route for the automated ground vehicle to optimize delivery using the one or more automated aerial vehicles in Example 1 includes determining using a neural network.

In Example 3, determining the timing for release of the one or more automated aerial vehicles during navigation of the delivery route to deliver packages to the plurality of delivery locations in any of Examples 1-2 includes determining using a neural network.

In Example 4, determining timing for release of the one or more automated aerial vehicles in any of Examples 1-3 includes determining based on one or more of: current traffic conditions along the driving route; a flight range of an aerial vehicle of the one or more automated aerial vehicles; a speed of the automated ground vehicle; and one or more weather conditions.

In Example 5, determining the driving route in any of Examples 1-4 includes determine a driving route that minimizes one or more of a distance traveled and a travel time for the driving route while passing within at least a flight range of each of the plurality of delivery locations, wherein the flight range corresponds to a flight range of the one or more automated aerial vehicles.

In Example 6, the method in any of Examples 1-5 further includes transmitting a current location to the one or more automated aerial vehicles when undocked.

In Example 7, the method in any of Examples 1-6 further includes generating a control signal to open or close a window of the automated vehicle to allow the one or more automated aerial vehicles to selectively enter or exit a cargo area of the automated ground vehicle.

Example 8 is a system that includes an identification component a delivery route component, a control component, and a release component. The identification component is configured to identify a plurality of delivery locations for package delivery. The delivery route component is configured to determine a driving route for an automated ground vehicle to optimize delivery to the delivery locations using one or more automated aerial vehicles. The control component is configured to control the automated ground vehicle to navigate the delivery route. The release component is configured to determine timing for release of the one or more automated aerial vehicles during navigation of the delivery route to deliver packages to the plurality of delivery locations.

In Example 9, the delivery route component in Example 8 is configured to determine the driving route using a neural network.

In Example 10, the release component in any of Examples 8-9 is configured to determine the timing for release of the one or more automated aerial vehicles using a neural network.

In Example 11, the release component in any of Examples 8-10 is configured to determine timing for release of the one or more automated aerial vehicles comprises determining based on one or more of: current traffic conditions along the driving route; a flight range of an aerial vehicle of the one or more automated aerial vehicles; a speed of the automated ground vehicle; and one or more weather conditions.

In Example 12, the delivery route component in any of Examples 8-11 is configured to determine a driving route that minimizes one or more of a distance traveled and a travel time for the driving route while passing within at least a flight range of each of the plurality of delivery locations, wherein the flight range corresponds to a flight range of the one or more automated aerial vehicles.

In Example 13, the system in any of Examples 8-12 further includes a charge component configured to provide a control signal to a dock to control charging of the one or more aerial vehicles when docked.

In Example 14, the system in any of Examples 8-13 further includes a location component configured to transmit a current location to the one or more automated aerial vehicles when undocked.

In Example 15, the release component in any of Examples 8-14 is further configured to generate a control signal to open or close a window of the automated vehicle to allow the one or more automated aerial vehicles to selectively enter or exit a cargo area of the automated ground vehicle.

Example 16, is computer readable storage media storing instructions that, when executed by one or more processors, cause the processors to identify a plurality of delivery locations for package delivery. The instructions cause the one or more processors to determine a driving route for an automated ground vehicle to optimize delivery to the delivery locations using one or more automated aerial vehicles. The instructions cause the one or more processors to control the automated ground vehicle to navigate the delivery route. The instructions cause the one or more processors to determine timing for release of the one or more automated aerial vehicles during navigation of the delivery route to deliver packages to the plurality of delivery locations.

In Example 17, the instructions in Example 16 cause the processors to determine the driving route for the automated ground vehicle to optimize delivery using the one or more automated aerial vehicles comprises determining using a neural network.

In Example 18, the instructions in any of Examples 16-17 cause the processors to determine the timing for release of the one or more automated aerial vehicles during navigation of the delivery route to deliver packages to the plurality of delivery locations comprises determining using a neural network.

In Example 19, the instructions in any of Examples 16-18 cause the processors to determine timing for release of the one or more automated aerial vehicles comprises determining based on one or more of: current traffic conditions along the driving route; a flight range of an aerial vehicle of the one or more automated aerial vehicles; a speed of the automated ground vehicle; and one or more weather conditions.

In Example 20, the instructions in any of Examples 16-19 cause the processors to determine a driving route that minimizes one or more of a distance traveled and a travel time for the driving route while passing within at least a flight range of each of the plurality of delivery locations, wherein the flight range corresponds to a flight range of the one or more automated aerial vehicles.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   identifying a plurality of delivery locations for package delivery;
   determining a delivery route for an automated ground vehicle to optimize a combination of a driving distance of the automated ground vehicle and flight distances of one or more automated aerial vehicles based at least in part on an overall delivery time;
   controlling the automated ground vehicle to navigate the delivery route; and
   determining timing for release of the one or more automated aerial vehicles during navigation of the delivery route to deliver packages to the plurality of delivery locations, wherein the timing optimizes travel time of the automated ground vehicle, and
   wherein determining the timing for release of the one or more automated aerial vehicles comprises determining, based on current traffic conditions along the delivery route, a flight range of an aerial vehicle of the one or more automated aerial vehicles, a speed of the automated ground vehicle, and one or more weather conditions.

2. The method of claim 1, wherein determining the delivery route for the automated ground vehicle comprises determining using a neural network.

3. The method of claim 1, wherein determining the timing for release of the one or more automated aerial vehicles during navigation of the delivery route to deliver packages to the plurality of delivery locations comprises determining using a neural network.

4. The method of claim 1, wherein determining the delivery route comprises determining the delivery route that minimizes a distance traveled and the travel time for the automated ground vehicle while passing within at least a flight range of each of the plurality of delivery locations, wherein the flight range of the each of the plurality of delivery locations corresponds to the flight range of the aerial vehicle of the one or more automated aerial vehicles.

5. The method of claim 1, further comprising transmitting a current location to the one or more automated aerial vehicles when undocked.

6. The method of claim 1, further comprising generating a control signal to open or close a window of the automated ground vehicle to allow the one or more automated aerial vehicles to selectively enter or exit a cargo area of the automated ground vehicle.

7. A system comprising:
   an identification component configured to identify a plurality of delivery locations for package delivery;
   a delivery route component configured to determine a delivery route for an automated ground vehicle to optimize a combination of a driving distance of the automated ground vehicle and a flight distance of one or more automated aerial vehicles based at least in part on an overall delivery time;
   a control component configured to control the automated ground vehicle to navigate the delivery route; and
   a release component configured to determine timing for release of the one or more automated aerial vehicles during navigation of the delivery route to deliver packages to the plurality of delivery locations, wherein the timing optimizes travel time of the automated ground vehicle, and
   wherein the release component is configured to determine the timing for release of the one or more automated aerial vehicles by determining, based on current traffic conditions along the delivery route, a flight range of an aerial vehicle of the one or more automated aerial vehicles, a speed of the automated ground vehicle, and one or more weather conditions.

8. The system of claim 7, wherein the delivery route component is configured to determine the delivery route using a neural network.

9. The system of claim 7, wherein the release component is configured to determine the timing for release of the one or more automated aerial vehicles using a neural network.

10. The system of claim 7, wherein the delivery route component is configured to determine the delivery route that minimizes a distance traveled and the travel time for the automated ground vehicle while passing within at least a flight range of each of the plurality of delivery locations, wherein the flight range of the each of the plurality of delivery locations corresponds to the flight range of the aerial vehicle of the one or more automated aerial vehicles.

11. The system of claim 7, further comprising a charge component configured to provide a control signal to a dock to control charging of the one or more automated aerial vehicles when docked.

12. The system of claim 7, further comprising a location component configured to transmit a current location to the one or more automated aerial vehicles when undocked.

13. The system of claim 7, wherein the release component is configured to generate a control signal to open or close a window of the automated ground vehicle to allow the one or more automated aerial vehicles to selectively enter or exit a cargo area of the automated ground vehicle.

14. One or more non-transitory computer readable storage media storing instructions that, when executed by one or more processors, cause the processors to:

identify a plurality of delivery locations for package delivery;

determine a delivery route for an automated ground vehicle to optimize a combination of a driving distance of the automated ground vehicle and a flight distance of one or more automated aerial vehicles based at least in part on an overall delivery time;

control the automated ground vehicle to navigate the delivery route; and determine timing for release of the one or more automated aerial vehicles during navigation of the delivery route to deliver packages to the plurality of delivery locations, wherein the timing optimizes travel time of the automated ground vehicle, and wherein the instructions cause the processors to determine the timing for release of the one or more automated aerial vehicles by determining, based on current traffic conditions along the delivery route, a flight range of an aerial vehicle of the one or more automated aerial vehicles, a speed of the automated ground vehicle, and one or more weather conditions.

15. The one or more non-transitory computer readable storage media of claim 14, wherein the instructions cause the processors to determine the delivery route comprises determining using a neural network.

16. The one or more non-transitory computer readable storage media of claim 14, wherein the instructions cause the processors to determine the timing for release of the one or more automated aerial vehicles during navigation of the delivery route to deliver packages to the plurality of delivery locations comprises determining using a neural network.

17. The one or more non-transitory computer readable storage media of claim 14, wherein the instructions cause the processors to determine the delivery route that minimizes a distance traveled and the travel time for the automated ground vehicle while passing within at least a flight range of each of the plurality of delivery locations, wherein the flight range of the each of the plurality of delivery locations corresponds to the flight range of the aerial vehicle of the one or more automated aerial vehicles.

* * * * *